June 8, 1948. C. B. BREEDLOVE 2,443,066
THREADED FASTENER OF THE ANCHOR BOOT TYPE
Filed Nov. 17, 1943

Inventor
CHARLES B. BREEDLOVE
By Barthel & Bugbee
Attorney

Patented June 8, 1948

2,443,066

UNITED STATES PATENT OFFICE 2,443,066

THREADED FASTENER OF THE ANCHOR BOOT TYPE

Charles B. Breedlove, Detroit, Mich.

Application November 17, 1943, Serial No. 510,625

6 Claims. (Cl. 151—21)

The present invention relates to improvements in threaded fasteners, and more particularly, to threaded fasteners of the anchor boot type.

The primary object of this invention is to provide a threaded fastener constructed from a single blank of relatively light-weight metal by a stamping operation whereby large numbers of threaded fasteners can be produced in a comparatively small amount of time with a considerable saving in both labor and time.

Another object of the invention is to provide a threaded fastener of the boot type in which the threaded portions of the fastener are extruded by a stamping operation performed on a single metal blank, so shaped and formed as to provide connected threaded portions to form the leg of the boot extruded from two zones or areas of the metal blank instead of the same zone.

Another object of the invention is to provide a threaded fastener of the boot type having an anchor flange portion to facilitate attachment of the threaded fastener to the work or other support prior to the insertion of a bolt, whereby the fastener may be applied to various locations generally inaccessible with other types of threaded fasteners.

Another object of the invention is to provide a threaded fastener of the above-mentioned type in which the superposed threaded nut portions are integrally connected by a thin strap portion stamped from the base of the blank and extending laterally therefrom between the ends of the base portion.

Another object of the invention is to provide a threaded fastener of the above-mentioned type in which the superposed threaded nut portions may be slightly offset to cause the threads of the uppermost nut portion to frictionally grip the threads of a bolt and thereby prevent the accidental separation thereof through vibration and jarring.

Another object of the invention is to provide a threaded fastener of the above type which is economical to manufacture, comparatively simple in construction and which comprises relatively few parts to become broken and damaged.

Other objects and advantages of the invention will become apparent during the course of the following description of the accompanying drawing, wherein.

Figure 1:
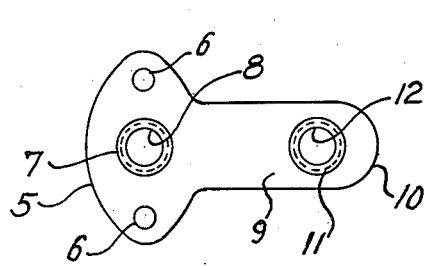
Figure 1 is a top plan view of one embodiment of the invention, illustrating the blank from which the threaded fastener is constructed and showing an anchor flange having a single strap extension provided adjacent its end with a threaded boss adapted to overlie a central thread boss on the anchor flange.
Figure 3:
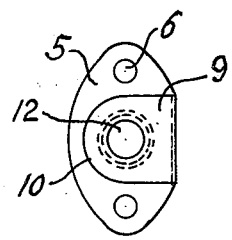
Figure 3 is a top plan view of the boot type anchor nut further showing the manner in which the connecting strap is bent and folded to position the threaded boss on the end of the strap above the central threaded boss in the anchor flange.
Figure 2:
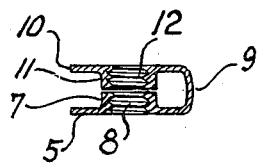
Figure 2 is a cross sectional view of the form of the invention shown in Figure 1 illustrating in detail the manner in which the connecting strap is bent and folded to position the threaded boss on the free end thereof above the central boss on the anchor flange.
Figure 6:
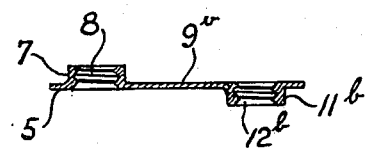
Figure 7:
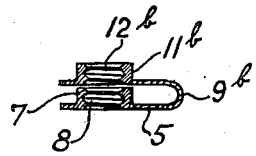

Figure 6 is a cross-sectional view of another modified form of the invention illustrating a stamping for a boot type anchor nut with the threaded extruded bosses extending in opposite directions so that when the threaded boss on the end of the strap is positioned to overlie the central threaded extruded boss, the threaded bosses will extend in the same direction; and Figure 7 is a cross-sectional view of the modified form of the invention in Figure 6 showing a boot type anchor nut with the threaded bosses extending in the same direction instead of being opposed as shown in Figures 1 to 3 inclusive.

In the drawing, wherein for the purpose of illustration there is shown in Figures 1 to 3 inclusive a preferred embodiment of the invention, the reference character 5 will generally be employed to designate a metal blank stamped or cut to form a flange of ovate shape having apertures 6 adjacent the ends thereof to facilitate the attachment of the ovate flange to a support or piece of work to be fastened.

A centrally formed annular extruded portion 7 is adapted to be stamped from the metal blank to provide a centralmost threaded opening 8 for the reception of a bolt or male fastener member.

Formed integral with the ovate flange portion 5 of the threaded fastener is a wing extension strap 9 having its free end rounded as at 10 to provide a neat, finished appearance. The ovate flange portion 5 and strap extension 9 are formed from a single piece of light-weight metal by a single stamping operation and at the same time.

The free end of the wing extension strap, adjacent the rounded portion 10 is formed with an annular extruded boss 11 stamped therefrom in much the same manner as the annular extruded boss 7 and it is intended to form both of the extruded annular bosses 7 and 11 during the same stamping operation. The annular extruded boss 11 is internally screw-threaded as at 12 to form a thread continuity with the threads in the annular extruded boss 7 when the strap 9 is bent as shown in Figure 2 to cause the annular extruded boss 11 to overlie the extruded boss 7.

In forming the extruded bosses 7 and 11, the one thereof will be slightly offset from the other so that when a bolt is passed through the threads thereof, a tight gripping action will result. By reason of the slight bevel edge of the extruded boss 11, a bolt will center itself relative to the threads in said boss 11 so that said bolt will be quickly guided to the threads of the boss 11. The threads of the boss 11 are preferably started at a point slightly in advance of the threads in the boss 7 so that a further locking and gripping action will occur. The threads in bosses 7 and 11 are identical in all respects as to pitch, diameters and spiral configuration but the spiral of the boss 11 is not an exact continuation of the spiral of boss 7 but the beginning of the spiral of boss 11, that lies adjacent to the end of the spiral in 7, is angularly advanced slightly from the normal continuation of the spiral in boss 7.

Figure 4:
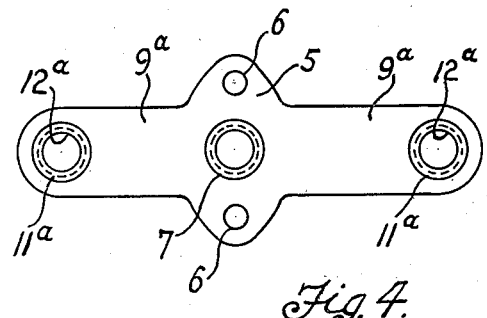
Figure 4 is a top plan view of the invention illustrating a modified form thereof and showing a blank stamped from a piece of metal having a pair of oppositely extending connecting straps for accommodating two superposed nut portions above the central threaded boss in the anchor flange.
Figure 5:
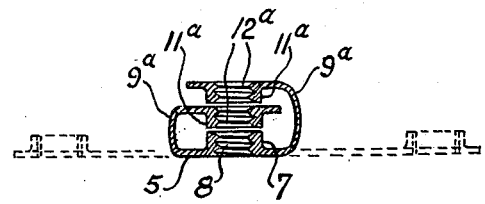
Figure 5 is a cross-sectional view of the form of the invention illustrated in Figure 4 showing the manner in which the pair of oppositely extending straps are connected to the anchor flange on both sides thereof and bent so that the threaded bosses on the ends of said straps will overlie the central threaded boss on the anchor flange in offset alignment therewith.

In the modified form of the invention shown in Figures 4 and 5, the ovate flange 5 and central annular extruded boss 7 are identical in construction to the form of the invention shown in Figures 1 and 3, and in Figures 4 and 5 a pair of wing extension straps 9a are formed integral with the ovate flange portion 5 and extend from opposite sides thereof. The free ends of the wing extension straps are rounded as at 10a and it is to be noted that one of the strap extensions 9a is formed slightly longer than the other so that when they are bent above the central extruded annular boss 7 they will be arranged in overlapping relation. The ends of the wing extensions 9a adjacent the rounded portions 10a are provided with annular extruded bosses 11a having inturned screw threads 12a and said annular bosses 11a are formed by a single stamping operation in the same manner as the annular threaded extruded bosses 7 and 11.

When the wing extensions 9a are bent as shown in Figures 4 and 5, the free ends overlap so that the threaded bosses 11a are in axial alignment. Said threaded bosses 11a, like the threaded bosses 7 and 11a, are adapted to be offset slightly from the central annular threaded boss 7 so that a greater gripping action will occur between the various threads therein and the threads of a bolt when said bolt is applied to the threaded fastener. Also, the various threads 12a in the annular extruded bosses 11a may be slightly rotated or started to interrupt the continuity of the threads when the same are positioned as shown in Figure 5 for the reception of a bolt.

By referring to Figures 6 and 7, it will be seen that the other modification of the invention embodies an ovate flange 5 similar to the flange shown in Figures 1 to 3 and 4 and 5, and said ovate flange is formed with a central annular boss 7 likewise similar to the annular boss shown in Figures 1 to 5 inclusive and is threaded internally as at 8. Formed integral with the ovate flange 5 is a strap extension 9b having its free end rounded and formed with an annular stamped-up boss 11b. It is to be noted that the annular boss 11b extrudes in a direction opposite to the annular extruded boss 7 before the blank shown in Figure 6 is bent and folded to cause said annular boss 11b to overlie the central boss 7. Internal screw threads 12b are formed in the annular extruded boss 11b so that the threads of the central boss 7 will align therewith when the strap 9b is bent as shown in Figure 7. It is to be noted that the extruded annular bosses 7 and 11b extrude in the same direction when in the position shown in Figure 7 so that a bolt may pass therethrough and be anchored therein. The threads 8 and 12b may be started at different angular points so that a binding action will occur when a bolt is threaded therethrough and in addition, said extruded annular boss 11b may be slightly offset axially to further increase the frictional lock on the threads of the bolt.

It is to be further noted that the threaded fastener, when thus formed by bending the respective wing extensions above the central annular extruded boss, can readily be adapted to various structures in which sheathing sheets or the like are to be securely fastened together or to other parts such as frame structures and the like.

It is to be understood that the forms of the invention herewith shown and described are to be taken as preferred embodiments of the same and that various changes in the size, shape and arrangement of parts may be resorted to without departing from the spirit of the invention or the scope of the subjoined claims.

What I claim is:

1. A threaded fastener comprising an ovate body portion having apertures adjacent each end, a strap extension formed integral with the body portion extending laterally therefrom, an extruded annular upstanding threaded boss formed on the ovate body portion and an extruded annular threaded boss formed on said strap end, said annular threaded bosses extending in the same direction and positioned one above the other when the strap extension is bent in overlapping relation to the ovate body portion, the threads in said annular bosses being formed so that the spiral of one is slightly angularly advanced from the normal continuation of the spiral of the other.

2. A threaded fastener of the anchor boot type, comprising an ovate body portion having apertures adjacent each end, a central extruded annular boss formed on the body portion having internal screw threads, a strap extension formed on the body portion projecting laterally from said body portion, and a threaded annular boss adjacent the end of said strap extension adapted to overlie said central threaded annular boss with the axes of the screw threads therein arranged in offset relation, the threads in said bosses being arranged so that the spiral of the threads in one is slightly angularly advanced from the spiral of the threads in the other.

3. A threaded fastener of the anchor boot type, comprising an ovate body portion having apertures adjacent each end, a central extruded annular boss formed on the body portion having internal screw threads, and a pair of oppositely extending wing extensions formed on said body portion having threaded annular bosses adapted to overlap and overlie said central threaded annular boss, the threads in said annular bosses being arranged so that the spiral of one set of threads is advanced from the normal continuation of the spiral of the other set of threads.

4. A threaded fastener of the anchor boot type, comprising an ovate body portion having apertures adjacent each end, a central extruded annular boss formed on the body portion having internal screw threads, and a pair of oppositely extending wing extensions formed on said body portion having threaded annular bosses at each end thereof adapted to overlap and overlie said central threaded annular boss when said wing extensions are bent upon themselves, said central and threaded bosses at the ends of said wing extensions being disposed in superposed relation with the thread spirals of each angularly advanced with respect to the normal continuation of the thread spiral of an adjacent threaded boss and said threaded bosses being disposed to prevent collapse of said wing extensions when a bolt is threaded therein.

5. A threaded fastener of the anchor boot type comprising an ovate body portion having apertures adjacent each end to facilitate affixing said body portion to a support, a central upstanding extruded annular boss formed on the body portion having internal screw threads, a pair of oppositely extending wing extensions formed on said body portion, and threaded annular bosses formed on said wing extensions adjacent the free ends thereof, said wing extensions being bent intermediate their lengths and arranged so that the threaded bosses thereof will overlap and overlie said central threaded annular boss, said central and threaded bosses on the ends of said wing extensions being positioned in superposed relation with their axes slightly offset with respect to one another, the spiral of the threads in the uppermost annular bosses being slightly angularly advanced relative to the normal continuation of the spiral of the threads in the lowermost annular bosses.

6. A threaded fastener of the anchor boot type comprising an ovate body portion having apertures adjacent each end to facilitate affixing said body portion to a support, a central extruded annular boss formed on the body portion having internal screw threads, a pair of oppositely extending wing extensions formed on said body portion, threaded annular bosses formed adjacent the ends of said wing extensions, said wing extensions being adapted to be bent intermediate their lengths so that the threaded bosses thereof will overlap and overlie said central threaded annular boss, said wing extensions being of different lengths to facilitate the overlapping thereof and the overlying of said annular threaded bosses with the spiral of the threads of the annular bosses in the ends of said wing extensions being slightly angularly advanced with respect to the normal continuation of the spiral of the threads in the central annular boss and also with respect to one another.

CHARLES B. BREEDLOVE.

REFERENCES CITED

The following references are of record in the file of this patent:

UNITED STATES PATENTS

| Number | Name | Date |
|---|---|---|
| 956,184 | Schoelkopf | Apr. 26, 1910 |
| 1,400,545 | Hleb | Dec. 20, 1921 |
| 1,873,895 | Kimball | Aug. 23, 1932 |
| 1,990,718 | Swanstrom | Feb. 12, 1935 |
| 2,258,845 | Burke | Oct. 14, 1942 |
| 2,284,824 | Hungerford | June 2, 1942 |
| 2,279,388 | Cox | Apr. 14, 1942 |
| 2,336,791 | LaBarre | Dec. 14, 1943 |
| 2,391,989 | Luce | Jan. 1, 1946 |

FOREIGN PATENTS

| Number | Country | Date |
|---|---|---|
| 286,120 | Great Britain | Mar. 1, 1928 |
| 349,541 | Great Britain | Nov. 22, 1929 |